Patented Jan. 31, 1950

2,495,827

UNITED STATES PATENT OFFICE 2,495,827

DIAZOTYPE MATERIALS STABILIZED WITH AN α-ALKYLIDENE-POLYMETHYLENE DICARBOXYLIC ACID

Sam C. Slifkin, Binghamton, N. Y., assignor to General Aniline & Film Corporation, New York, N. Y., a corporation of Delaware No Drawing. Application August 6, 1947, Serial No. 766,877

12 Claims. (Cl. 95—6)

This invention relates to stabilization of diazotype printing material, containing a light-sensitive diazo compound in a sensitized layer on a suitable base. More particularly, the invention relates to stabilization of diazotype layers wherein a light-sensitive diazo compound, for example, those obtained by diazotization of ortho-amino naphthols, and of aromatic paradiamines containing one or two substituents in one of the amino groups, is incorporated together with an azo coupling component in or on a carrier.

When layers thus sensitized are exposed to light of locally varied intensity (e. g. by exposure under a photographic transparency or a translucent sheet bearing an opaque design), the diazo compound is destroyed in the exposed portions, and an image can be developed by treatment so as to cause coupling of the remaining diazo compound with the coupling component in the layer. Thus, an exposed two-component layer can be developed by treatment with a gaseous base such as ammonia to effect the desired coupling, or moistened with a solution containing an alkaline-reacting material. In the case of layers which contain a light-sensitive diazo component without a coupler, development can be effected by treatment with an alkaline solution containing a coupler.

The sensitizing compositions incorporated in light-sensitive diazotype layers are relatively unstable, and are subject to deterioration when stored for prolonged periods before use, whereby their sensitivity is often seriously impaired, and two-component layers are subject to premature coupling, causing discoloration of the background and loss in sensitivity.

After treatment, particularly in dry processes employing gaseous ammonia, or in wet development processes in which the developer solution is allowed to remain on the copies, the background as well as the image portions of the copies contain decomposition products of the diazo compounds and uncombined azo coupling components. These materials tend to become discolored or yellow upon exposure to light and air.

It has been attempted heretofore to stabilize diazotype sensitizing solutions and layers against deterioration and premature coupling during storage, as well as against discoloration of the background after development. Thus, it has been proposed to incorporate reagents such as buffers, reducing agents and anti-oxidants in the sensitizing solution or layer to effect such stabilization in one or more respects. While some improvement has been achieved by these proposals, in general the materials added were only partly effective, or were adapted only to stabilize the layer against some, but not all, of the aforesaid defects.

I have now discovered that diazotype sensitizing compositions and light-sensitive layers produced therewith can be better stabilized, not only against premature coupling and deterioration on storage, even under unfavorable conditions, but also against background discoloration after development upon exposure to light and air, by incorporating in the sensitizing layer, for example, by inclusion in the sensitizing composition of an α-alkylidene-polymethylene dicarboxylic acid having the general formula:

$$\begin{array}{l} R{-}CH{=}C{-}COOH \\ \qquad\quad | \\ \qquad\quad (CH_2)_n{-}COOH \end{array}$$

wherein R is selected from the group consisting of hydrogen, alkyl, aralkyl and aryl groups, and $n$ is a small integer, for example from 1 to 4.

Such acids include, for example, the following:

α-Methylene-glutaric
Gamma-methyl-itaconic
Gamma-ethyl-itaconic
Itaconic
Gamma-propyl-itaconic
Gamma-isobutyl itaconic
Gamma-hexyl itaconic
Gamma-phenyl itaconic
Gamma-(beta-phenyl ethyl)-itaconic
Gamma-(4-isopropyl phenyl)-itaconic
Alpha-ethylidene-glutaric
Alpha-isoamylidene-glutaric
Alpha-ethylidene-adipic These acids are advantageously incorporated in the sensitizing solutions containing a light-sensitive diazo compound, preferably together with an azo coupling component, as well as other ingredients conventionally employed in such mixtures. While the stabilizing compounds of this invention can be used alone, it is generally advantageous to include them together with other materials, serving for example, as buffers, dye-fixing agents, anti-oxidants and the like which also have stabilizing properties, e. g. crotonic acid and its derivatives, tartaric or citric acid, sulfo-ortho-hydroxy aromatic carboxylic acids, boric acid, thiourea, gamma-lactones, etc.

Since the sensitizing solution is generally made up in aqueous or aqueous alcoholic medium, the stabilizing acid of this invention should be chosen so as to have sufficient solubility in the medium employed to yield the required concentration thereof. Of the acids enumerated above, itaconic and α-methylene-glutaric acids are preferred from the standpoint of water solubility, effectiveness and availability. The free acids can be used as such or they may be used in the form of soluble salts, since the pH of the sensitizing solution is ordinarily adjusted by other ingredients to an appropriate value, so that the stabilizing acid in the solution may be present in its free state or in partly or completely neutralized form depending upon the other components of the mixture.

The amount of stabilizing acid in my invention employed in the sensitizing composition can be varied over a relatively wide range. However, amounts within the range of 1 to 10 parts of stabilizing acid for each 5 parts of light-sensitive diazo compound have been found particularly effective and suitable.

The sensitizing solution, as well as the resultant sensitized layers containing the acids of my invention, are stabilized so as to prevent deterioration on storage as well as premature coupling of two-component diazotype compositions. Upon exposure and development of such sensitized layers, photoprint copies are obtained in which the background is far more stable against discoloration or yellowing, even when exposed to light and air, despite the fact that coupling components as well as decomposition products of the diazo compounds may be present therein.

The following examples illustrate diazotype compositions stabilized in accordance with my invention, and their use in making photoprinting materials:

*Example 1*

A diazotype sensitizing solution was prepared having the following composition:

| | | |
|---|---|---|
| Water | cubic centimeters | 100 |
| Glycol | do | 5 |
| Citric acid | grams | 5 |
| Thiourea | do | 2 |
| Zinc chloride | do | 2 |
| p-Diazo-N-dimethyl aniline | do | 2 |
| 2,3-dihydroxynaphthalene-6-sulfonic acid | do | 3 |
| Itaconic acid | do | 3 |

This composition was coated on paper stock and dried, yielding a photoprinting paper of high stability during storage. On exposure of the resulting sensitized paper to actinic light under suitable pattern to be reproduced, a deep blue copy on a white background was obtained, wherein the background possessed excellent stability to yellowing on exposure to light and air.

*Example 2*

A diazotype sensitizing solution was prepared having the following composition:

| | | |
|---|---|---|
| Water | cubic centimeters | 100 |
| Glycol | do | 5 |
| Citric acid | grams | 6 |
| Boric acid | do | 3 |
| Thiourea | do | 2 |
| Zinc chloride | do | 2 |
| p-Diazo N-dimethyl aniline | do | 6 |
| Resorcinol | do | 2 |
| Itaconic acid | do | 3 |

The resulting solution was coated on lightweight paper, yielding a sensitized photoprint material which can be stored for long periods without substantial deterioration, and upon exposure and development yields copies having a brown image of good opacity to ultra-violet light, and a white background which is remarkably stable to yellowing upon exposure to light and air.

*Example 3*

A diazotype sensitizing solution was prepared having the following composition:

| | | |
|---|---|---|
| Water | cubic centimeters | 60 |
| Ethanol | do | 30 |
| Citric acid | grams | 5 |
| Thiourea | do | 2 |
| Zinc chloride | do | 2 |
| p-Diazo N-ethylol aniline | do | 8 |
| 1,8-aminonaphthol-2,4-disulfonic acid | do | 4 |
| Itaconic acid | do | 3 |

The resulting solution was impregnated on a cellulose acetate film and dried, yielding a sheet of excellent resistance to deterioration on storage, which upon exposure and development as in the preceding examples, yields a print having a blue image on a colorless background of excellent resistance to discoloration upon exposure to light and air.

Substitution of corresponding amounts of α-methylene-glutaric acid for the itaconic acid in the foregoing examples yields similarly superior results.

Various light-sensitive diazo compounds and other coupling components may be used as well as different supports or carriers (e. g. gelatin coatings), in place of those disclosed in the foregoing examples. Any of the conventional developing processes commonly employed for di-azotype prints can be used for the sensitized photoprinting material of this invention.

I claim:

1. Photoprinting material comprising a light-sensitive layer containing a light-sensitive diazo compound, and as a stabilizer therefor an acid having the formula:

$$\mathrm{R{-}CH{=}\underset{\displaystyle (CH_2)_n{-}COOH}{\underset{|}{C}}{-}COOH}$$

wherein R is selected from the group consisting of hydrogen, alkyl, aralkyl and aryl groups, and $n$ is an integer from 1 to 4.

2. Photoprinting material comprising a light-sensitive layer containing a light-sensitive diazo compound suitable for forming a sable two-component diazotype layer, an azo dye coupling component, and as a stabilizer therefor an acid having the formula:

$$\mathrm{R{-}CH{=}\underset{\displaystyle (CH_2)_n{-}COOH}{\underset{|}{C}}{-}COOH}$$

wherein R is selected from the group consisting of hydrogen, alkyl, aralkyl and aryl groups, and $n$ is an integer from 1 to 4.

3. Photoprinting material comprising a light-sensitive gelatin layer, impregnated with a light-sensitive diazo compound suitable for forming a stable two-component diazo layer, an azo dye coupling component, and as a stabilizer therefor an acid having the formula:

$$\mathrm{R{-}CH{=}\underset{\displaystyle (CH_2)_n{-}COOH}{\underset{|}{C}}{-}COOH}$$

wherein R is selected from the group consisting of hydrogen, alkyl, aralkyl and aryl groups, and $n$ is an integer from 1 to 4.

4. Photoprinting material comprising a light-sensitive layer containing a light-sensitive diazo compound suitable for forming a stable two-component diazotype layer, an azo dye coupling component, and as a stabilizer therefor itaconic acid.

5. Photoprinting material comprising a light-sensitive layer containing a light-sensitive diazo compound suitable for forming a stable two-component diazotype layer, an azo dye coupling component, and as a stabilizer therefor α-methylene-glutaric acid.

6. A sensitizing composition for diazotype photoprinting materials comprising a light-sensitive diazo compound in aqueous solution, and as a stabilizer therefor, an acid having the formula:

$$R-CH=\underset{\displaystyle (CH_2)_n-COOH}{\underset{|}{C}}-COOH$$

wherein R is selected from the group consisting of hydrogen, alkyl, aralkyl and aryl groups, and $n$ is an integer from 1 to 4.

7. A sensitizing composition for diazotype photoprinting material comprising a light-sensitive diazo compound suitable for forming a stable two-component layer, and an azo dye coupling component, in aqueous solution, and as a stabilizer therefor, an acid having the formula:

$$R-CH=\underset{\displaystyle (CH_2)_n-COOH}{\underset{|}{C}}-COOH$$

wherein R is selected from the group consisting of hydrogen, alkyl, aralkyl and aryl groups, and $n$ is an integer from 1 to 4.

8. A sensitizing composition for diazotype photoprinting material comprising a light-sensitive diazo compound suitable for forming a stable two-component layer, and an azo dye coupling component, in aqueous solution, and as a stabilizer therefor, itaconic acid.

9. A sensitizing composition for diazotype photoprinting material comprising a light-sensitive diazo compound suitable for forming a stable two-component layer, and an azo dye coupling component, in aqueous solution, and as a stabilizer therefor, α-methylene-glutaric acid.

10. Developed diazotype photoprinting material having in the image-forming layer thereof, an azo dye image, azo coupling component and light-decomposed diazo compound residues, and an acid having the general formula:

$$R-CH=\underset{\displaystyle (CH_2)_n-COOH}{\underset{|}{C}}-COOH$$

wherein R is selected from the group consisting of hydrogen, alkyl, aralkyl and aryl groups, and $n$ is an integer from 1 to 4.

11. Developed diazotype photoprinting material having in the image-forming layer thereof, an azo dye image, azo coupling component and light-decomposed diazo compound residues, and itaconic acid.

12. Developed diazotype photoprinting material having in the image-forming layer thereof, an azo dye image, azo coupling component and light-decomposed diazo compound residues, and α-methylene-glutaric acid.

SAM C. SLIFKIN.

REFERENCES CITED

The following references are of record in the file of this patent:

UNITED STATES PATENTS

| Number | Name | Date |
|---|---|---|
| 2,354,088 | Reichel | July 18, 1944 |

Certificate of Correction

Patent No. 2,495,827 January 31, 1950

SAM C. SLIFKIN

It is hereby certified that errors appear in the printed specification of the above numbered patent requiring correction as follows:

Column 1, line 37, for the word "treatment" read *development*; column 4, line 52, for "sable" read *stable*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*